US010706719B2

(12) United States Patent
Zhang et al.

(10) Patent No.: US 10,706,719 B2
(45) Date of Patent: Jul. 7, 2020

(54) TRAFFIC SIGNAL INDICATING METHOD, APPARATUS AND SYSTEM, AND MACHINE-READABLE MEDIUM

(71) Applicant: Siemens Aktiengesellschaft, Munich (DE)

(72) Inventors: Yi Chi Zhang, Beijing (CN); Luo Sha Liu, Beijing (CN); Zhi Hao Li, Beijing (CN)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 48 days.

(21) Appl. No.: 16/045,882

(22) Filed: Jul. 26, 2018

(65) Prior Publication Data

US 2019/0236939 A1  Aug. 1, 2019

(30) Foreign Application Priority Data

Jan. 30, 2018  (CN) .......................... 2018 1 0088165

(51) Int. Cl.
*G08G 1/005* (2006.01)
*G08G 1/095* (2006.01)
(Continued)

(52) U.S. Cl.
CPC ............. *G08G 1/005* (2013.01); *G03B 29/00* (2013.01); *G06K 9/00369* (2013.01);
(Continued)

(58) Field of Classification Search
None
See application file for complete search history.

(56) References Cited

U.S. PATENT DOCUMENTS 5,559,509 A * 9/1996 Ogle ................ G08G 1/005
116/63 R
9,168,867 B2 * 10/2015 Tamatsu ................ G08G 1/005
(Continued)

FOREIGN PATENT DOCUMENTS

DE  202016004063 U1  8/2016
KR  101806470 B1  1/2018
(Continued)

OTHER PUBLICATIONS

Extended European Search Report dated Jul. 23, 2019.
Partial European Search Report dated Feb. 6, 2019.

*Primary Examiner* — Steven Lim
*Assistant Examiner* — Muhammad Adnan
(74) *Attorney, Agent, or Firm* — Harness, Dickey & Pierce, P.L.C.

(57) ABSTRACT

Embodiments of the application relate to the field of traffic, more particularly to a method, apparatus and system for indicating a traffic signal. An embodiment is directed to a traffic signal indicating method effective on a pedestrian and/or vehicle. A traffic signal indicating system of an embodiment includes a traffic signal indicating apparatus, configured to acquire a traffic control state of a traffic management area; and a projection apparatus, configured to project first visual information for indicating the traffic control state to a first-segment pavement of the traffic management area. By projecting visual information for indicating a current traffic control state to a pavement of a traffic management area, a purpose of reminding a pedestrian and a vehicle is achieved. The projected visual information may transfer rich information. Further, it is unnecessary to modify existing traffic lights.

17 Claims, 6 Drawing Sheets

(51) Int. Cl.
*G08G 1/01* (2006.01)
*G03B 29/00* (2006.01)
*G06K 9/00* (2006.01)

(52) U.S. Cl.
CPC ....... *G06K 9/00785* (2013.01); *G08G 1/0116* (2013.01); *G08G 1/0133* (2013.01); *G08G 1/0145* (2013.01); *G08G 1/095* (2013.01)

(56) References Cited

U.S. PATENT DOCUMENTS

| | | | | |
|---|---|---|---|---|
| 9,578,221 B1* | 2/2017 | Brown | | G03B 13/04 |
| 9,771,021 B1* | 9/2017 | Lindsay | | B60Q 1/525 |
| 9,805,474 B1* | 10/2017 | Whiting | | G08G 1/166 |
| 10,118,548 B1* | 11/2018 | Fields | | B60Q 5/005 |
| 10,261,513 B2* | 4/2019 | Reiley | | G05D 1/0061 |
| 10,354,523 B2* | 7/2019 | Jin | | G06K 9/00785 |
| 10,421,389 B2* | 9/2019 | Nagata | | G06K 9/00805 |
| 10,431,076 B2* | 10/2019 | Jung | | G08G 1/005 |
| 10,457,199 B2* | 10/2019 | Kunii | | H04N 9/3185 |
| 10,510,253 B2* | 12/2019 | Zhang | | G06K 9/00812 |
| 2015/0154863 A1* | 6/2015 | Fossier | | G09F 9/33 340/907 |
| 2016/0019783 A1* | 1/2016 | Gao | | G08G 1/052 340/916 |
| 2017/0067609 A1* | 3/2017 | Ichikawa | | B60Q 1/0041 |
| 2017/0169703 A1* | 6/2017 | Carrasco | | B60Q 1/525 |
| 2018/0012487 A1* | 1/2018 | Ruenz | | G08G 1/164 |
| 2018/0302752 A1* | 10/2018 | Ueno | | H04W 4/08 |
| 2018/0319325 A1* | 11/2018 | Tatara | | B60Q 1/50 |
| 2019/0088112 A1 | 3/2019 | Jung et al. | | |
| 2019/0197883 A1* | 6/2019 | Camras | | B60Q 1/525 |

FOREIGN PATENT DOCUMENTS

| | | | | |
|---|---|---|---|---|
| WO | WO 2016205530 A1 | 12/2016 | | |
| WO | WO-2017038126 A1 * | 3/2017 | ............ | G08G 1/005 |
| WO | WO 2017038126 A1 | 3/2017 | | |

* cited by examiner

TRAFFIC SIGNAL INDICATING METHOD, APPARATUS AND SYSTEM, AND MACHINE-READABLE MEDIUM

PRIORITY STATEMENT

The present application hereby claims priority under 35 U.S.C. § 119 to Chinese patent application number CN 201810088165.7 filed Jan. 30, 2018, the entire contents of which are hereby incorporated herein by reference.

FIELD

At least one embodiment of the present invention generally relates to the technical field of traffic, and more particularly to a traffic signal indicating method, apparatus and system, and a machine-readable medium.

BACKGROUND

Because an intersection is a high incidence area of traffic accidents and jams, traffic management on the intersection is very important, and it is usually necessary to coordinate traffic behaviors between a pedestrian and a vehicle. A difficult point of the traffic management on the intersection is: a pedestrian does not obey the traffic laws sometimes and does not act in accordance with indication of traffic lights, and it is difficult to unify behaviors of a large number of pedestrians. Moreover, disorder of standing positions of a large number of pedestrians may also affect traffic flow.

Current traffic lights make few restraints on pedestrians, and may be covered by a road infrastructure sometimes due to a small size, thereby failing in visually attracting pedestrians. Traffic management on a non-motor vehicle also has the same problem.

In China, the traffic management department may arrange some traffic management assistants at some intersections to standardize behaviors of pedestrians. A traffic management assistant may usually instruct pedestrians to move or stop by using a colored flag. Furthermore, retractable doors are installed on some other intersections to stop pedestrians from running a red light. The manner of instructing, by a traffic management assistant, a pedestrian via a colored flag also has the problem of difficulty in visually attracting the pedestrian. It takes time to retract the retractable doors, thereby causing the problem of low efficiency.

SUMMARY

Embodiments of the present application provide a method, apparatus and system for indicating a traffic signal, and a machine-readable medium, and are directed to a traffic signal indicating method effective on a pedestrian and/or vehicle, thereby improving the efficiency of traffic management on an intersection, and reducing the occurrence of traffic accidents and jams.

According to a first embodiment, a traffic signal indicating system is provided. The system may comprise: a traffic signal indicating apparatus, configured to acquire a traffic control state of a traffic management area; and a projection apparatus, configured to project first visual information for indicating the traffic control state to a first-segment pavement of the traffic management area under the control of the traffic signal indicating apparatus. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

According to a second embodiment, a traffic signal indicating apparatus is provided. The apparatus comprises: a state acquisition module, configured to acquire a traffic control state of a traffic management area; and a projection module, configured to project first visual information for indicating the traffic control state to a first-segment pavement within the traffic management area. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

According to a third embodiment, a traffic signal indicating method is provided. The method comprises: acquiring a traffic control state of a traffic management area; and projecting first visual information for indicating the traffic control state to a first-segment pavement within the traffic management area. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

According to a fourth embodiment, a traffic signal indicating apparatus is provided. The apparatus comprises: at least one memory, configured to store a machine-readable instruction; and at least one processor, configured to call the machine-readable instruction to execute the method provided by the third embodiment or any possible implementation mode of the third embodiment.

According to a fifth embodiment, a machine-readable medium is provided. The machine-readable medium comprises: a machine-readable instruction, when being executed by at least one processor, the machine-readable instruction executing the method provided by the third embodiment or any possible implementation mode of the third embodiment.

BRIEF DESCRIPTION OF THE DRAWINGS

The foregoing characteristics, technical features, advantages and implementation modes of the present invention will be further described below by way of the description of the preferred embodiments in a clear and understandable manner in conjunction with the drawings, wherein.

DRAWING MARK LIST

Figure 1:
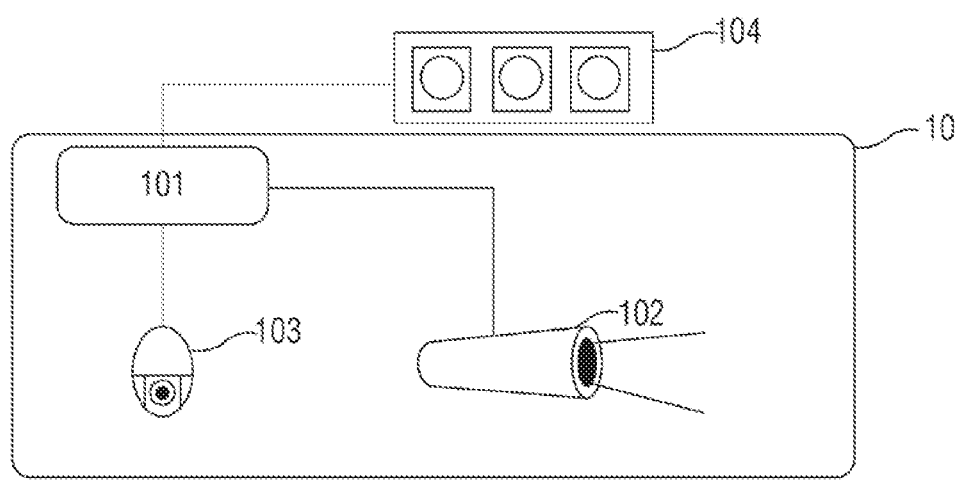
FIG. 1 is a structure diagram of a traffic signal indicating system provided in the embodiments of the present invention.

| | | |
|---|---|---|
| 10: Traffic signal indicating system | 101: Traffic signal indicating apparatus | 102: Projection apparatus |
| 103: Sensor | 104: Traffic light | 101': Traffic management system |
| 30: Traffic management area | 301: First-segment pavement (pedestrian prohibition and allowance) | |
| 302: Second-segment pavement (pedestrian prohibition and pedestrian waiting area) | | |
| 303: Third-segment pavement (where a motor vehicle avoids a pedestrian) | | |
| 20: Pedestrian | 30: Motor vehicle | |
| S401: Acquire a traffic control state | | |
| S402: Judge the traffic control state | | |
| S403: Project first visual information for prompting pedestrian allowance | | |
| S404: Project first visual information for prompting pedestrian prohibition | | |
| S405: Acquire the quantity of pedestrians within a traffic management area 30 | | |
| S406: Determine a second-segment pavement 302 where a pedestrian may stay whilst waiting within the traffic management area 30 | | |
| S407: Project second visual information for indicating a range within which a pedestrian may stay whilst waiting to the second-segment pavement 302 | | |
| S411: Collect information | | |
| S412: Judge whether a vehicle needs to avoid a pedestrian | | |
| S413: Project third visual information for instructing the vehicle to avoid the pedestrian | | |
| 1011: State acquisition module | 1012: Projection module | |
| 1013: Memory | 1014: Processor | |

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory.

These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, a traffic signal indicating system is provided. The system may comprise: a traffic signal indicating apparatus, configured to acquire a traffic control state of a traffic management area; and a projection apparatus, configured to project first visual information for indicating the traffic control state to a first-segment pavement of the traffic management area under the control of the traffic signal indicating apparatus. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

Alternatively, the traffic control state of the traffic management area, acquired by the traffic signal indicating apparatus, is one of at least two states, and the traffic signal indicating apparatus pre-stores the first visual information corresponding to each of the at least two states respectively. After acquiring the traffic control state of the traffic management area, the traffic signal indicating apparatus acquires the pre-stored first visual information corresponding to the traffic control state, and the projection apparatus projects the pre-stored first visual information that corresponds to the traffic control state and is acquired by the traffic signal indicating apparatus. Thus, it is unnecessary to currently generate visual information projected by the projection apparatus, but pre-stored visual information is directly acquired, so that the efficiency of visual information indication is higher, and the visual information indication is timelier.

Alternatively, when the traffic control state acquired by the traffic signal indicating apparatus is pedestrian prohibition, the projection apparatus is specifically configured to project the first visual information for prompting pedestrian prohibition to the first-segment pavement in a pedestrian advancing direction within the traffic management area; or, alternatively, when the traffic control state acquired by the traffic signal indicating apparatus is pedestrian allowance, the projection apparatus is specifically configured to project the first visual information for prompting pedestrian allowance to the first-segment pavement in a pedestrian advancing direction within the traffic management area. Here, the alternative solution may prompt pedestrian prohibition or allowance. Here, when the traffic control state acquired by the traffic signal indicating apparatus is pedestrian allowance, the first visual information projected by the projection apparatus further prompts the pedestrian advancing direction. Thus, clearer and richer prompt information is provided for the pedestrian, to make it convenient for the pedestrian to determine the advancing direction.

Alternatively, when the traffic control state is pedestrian prohibition, the traffic signal indicating apparatus is further configured to acquire the quantity of pedestrians within the traffic management area, and determine a second-segment pavement where a pedestrian may stay whilst waiting within the traffic management area in accordance with the acquired quantity of pedestrians, wherein as the quantity of pedestrians within the traffic management area is larger, the area of the second-segment pavement is larger; and the projection apparatus is further configured to project second visual information for indicating a range within which a pedestrian may stay whilst waiting to the second-segment pavement under the control of the traffic signal indicating apparatus. Here, a pavement where a pedestrian may stay whilst waiting is determined according to the quantity of pedestrians, and visual information is projected to the determined pavement. On one hand, the solution of controlling a range within which a pedestrian may stay according to the quantity of pedestrians is reasonable and flexible to implement. On the other hand, visual information is projected to indicate the range within which a pedestrian may stay, so as to easily attract pedestrians, thereby simply and effectively implementing traffic management on the pedestrians.

Alternatively, the traffic signal indicating apparatus is further configured to: control the projection apparatus to project third visual information to a third-segment pavement in a vehicle advancing direction when detecting that a pedestrian is passing within the traffic management area and a vehicle will enter the traffic management area, the third visual information indicating the passage of a pedestrian in front of a vehicle waiting for entry; or, detect a vehicle entry situation of the traffic management area, and project third visual information to a third-segment pavement in the vehicle advancing direction when detecting that a vehicle will enter the traffic management area and the traffic control state is pedestrian allowance, the third visual information indicating the passage of a pedestrian in front of a vehicle waiting for entry; or, project at least one piece of third visual information nearby a pedestrian allowed pavement when the traffic control state is pedestrian allowance, the third visual information indicating the passage of a pedestrian in front of a vehicle. Thus, the vehicle may be effectively reminded of avoidance of the pedestrian.

Alternatively, the traffic signal indicating apparatus is specifically configured to acquire a traffic control state of the traffic management area from at least one traffic light within the traffic management area, or acquire a traffic control state in synchronization with at least one traffic light within the traffic management area.

According to a second embodiment, a traffic signal indicating apparatus is provided. The apparatus comprises: a state acquisition module, configured to acquire a traffic control state of a traffic management area; and a projection module, configured to project first visual information for indicating the traffic control state to a first-segment pavement within the traffic management area. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

Alternatively, the traffic control state of the traffic management area, acquired by the state acquisition module, is one of at least two states. The state acquisition module is further configured to: pre-store the first visual information corresponding to each of the at least two states respectively; and acquire, after acquiring the traffic control state of the traffic management area, the pre-stored first visual information corresponding to the traffic control state. The projection module is specifically configured to project the pre-stored first visual information that corresponds to the traffic control state and is acquired by the state acquisition module. Thus, it is unnecessary to currently generate visual information projected by the projection module, but pre-stored visual information is directly acquired, so that the efficiency of visual information indication is higher, and the visual information indication is timelier.

Alternatively, when the traffic control state acquired by the state acquisition module is pedestrian prohibition, the projection module is specifically configured to project the first visual information for prompting pedestrian prohibition to the first-segment pavement in a pedestrian advancing direction within the traffic management area; or, when the traffic control state acquired by the state acquisition module is pedestrian allowance, the projection module is specifically configured to project the first visual information for prompting pedestrian allowance to the first-segment pavement in a pedestrian advancing direction within the traffic management area. Alternatively, the first visual information for prompting pedestrian allowance further prompts the pedestrian advancing direction. Thus, clearer and richer prompt information is provided for the pedestrian, to make it convenient for the pedestrian to determine the advancing direction.

Alternatively, when the traffic control state acquired by the state acquisition module is pedestrian prohibition, the state acquisition module is further configured to acquire the quantity of pedestrians within the traffic management area, and the projection module is further configured to determine a second-segment pavement where a pedestrian may stay whilst waiting within the traffic management area in accordance with the acquired quantity of pedestrians, and project second visual information for indicating a range within which a pedestrian may stay whilst waiting to the determined second-segment pavement, wherein as the quantity of pedestrians within the traffic management area is larger, the area of the second-segment pavement is larger. Here, a pavement where a pedestrian may stay whilst waiting is determined according to the quantity of pedestrians, and visual information is projected to the determined pavement. On one hand, the solution of controlling a range within which a pedestrian may stay according to the quantity of pedestrians is reasonable and flexible to implement. On the other hand, visual information is projected to indicate the range within which a pedestrian may stay, so as to easily attract pedestrians, thereby simply and effectively implementing traffic management on the pedestrians.

Alternatively, the state acquisition module is further configured to detect a pedestrian passage situation and a vehicle entry situation within the traffic management area; the projection module is further configured to project, when the state acquisition module detects that a pedestrian is passing within the traffic management area and a vehicle will enter the traffic management area, third visual information to a third-segment pavement in a vehicle advancing direction, the third visual information indicating the passage of a pedestrian in front of a vehicle waiting for entry; or, the state acquisition module is further configured to detect a vehicle entry situation of the traffic management area, and the projection module is further configured to project, when the state acquisition module detects that a vehicle will enter the traffic management area and the traffic control state is pedestrian allowance, third visual information to a third-segment pavement in the vehicle advancing direction, the third visual information indicating the passage of a pedestrian in front of a vehicle waiting for entry; or, the projection module is further configured to project, when the traffic control state is pedestrian allowance, at least one piece of third visual information nearby a pedestrian allowed pavement, the third visual information indicating the passage of a pedestrian in front of a vehicle. Thus, the vehicle may be effectively reminded of avoidance of the pedestrian.

Alternatively, the state acquisition module is specifically configured to acquire a traffic control state of the traffic management area from at least one traffic light within the traffic management area, or acquire a traffic control state in synchronization with at least one traffic light within the traffic management area.

According to a third embodiment, a traffic signal indicating method is provided. The method comprises: acquiring a traffic control state of a traffic management area; and projecting first visual information for indicating the traffic control state to a first-segment pavement within the traffic management area. By projecting visual information for indicating a current traffic control state to a pavement of a traffic management area, a purpose of reminding a pedestrian and a vehicle is achieved. The projected visual information may transfer rich information, and has the advantage of clear indication to make it easier to attract a pedestrian. Moreover, it is unnecessary to modify existing traffic lights due to the present solution, which is effective and makes a slight modification on an existing system.

Alternatively, when the acquired traffic control state of the traffic management area is one of at least two states, the method further comprises: pre-storing the first visual information corresponding to each of the at least two states respectively; and acquiring, after acquiring the traffic control state of the traffic management area, the pre-stored first visual information corresponding to the traffic control state. Projecting the first visual information comprises: projecting the acquired pre-stored first visual information corresponding to the traffic control state. Thus, it is unnecessary to currently generate projected visual information, but pre-stored visual information is directly acquired, so that the efficiency of visual information indication is higher, and the visual information indication is timelier.

Alternatively, when the traffic control state is pedestrian prohibition, projecting first visual information for indicating the traffic control state to a first-segment pavement within the traffic management area comprises: projecting the first visual information for prompting pedestrian prohibition to the first-segment pavement in a pedestrian advancing direction within the traffic management area; or, when the traffic control state is pedestrian allowance, projecting first visual information for indicating the traffic control state to a first-segment pavement within the traffic management area comprises: projecting the first visual information for prompting pedestrian allowance to the first-segment pavement in a pedestrian advancing direction within the traffic management area. Here, the alternative solution may prompt pedestrian prohibition or allowance. Here, the first visual information for prompting pedestrian allowance further prompts the pedestrian advancing direction. Thus, clearer and richer prompt information is provided for the pedestrian, to make it convenient for the pedestrian to determine the advancing direction.

Alternatively, when the traffic control state is pedestrian prohibition, the method further comprises: acquiring the quantity of pedestrians within the traffic management area; determining a second-segment pavement where a pedestrian may stay whilst waiting within the traffic management area in accordance with the acquired quantity of pedestrians, wherein as the quantity of pedestrians within the traffic management area is larger, the area of the second-segment pavement is larger; and projecting second visual information for indicating a range within which a pedestrian may stay whilst waiting to the determined second-segment pavement. Here, a pavement where a pedestrian may stay whilst waiting is determined according to the quantity of pedestrians, and visual information is projected to the determined pavement. On one hand, the solution of controlling a range within which a pedestrian may stay according to the quantity of pedestrians is reasonable and flexible to implement. On the other hand, visual information is projected to indicate the range within which a pedestrian may stay, so as to easily attract pedestrians, thereby simply and effectively implementing traffic management on the pedestrians.

Alternatively, the method further comprises: detecting a pedestrian passage situation and a vehicle entry situation within the traffic management area, and projecting third visual information to a third-segment pavement in a vehicle advancing direction when detecting that a pedestrian is passing within the traffic management area and a vehicle will enter the traffic management area, the third visual information indicating the passage of a pedestrian in front of a vehicle waiting for entry; or, detecting a vehicle entry situation of the traffic management area, and projecting third visual information to a third-segment pavement in the vehicle advancing direction when detecting that a vehicle will enter the traffic management area and the traffic control state is pedestrian allowance, the third visual information indicating the passage of a pedestrian in front of a vehicle waiting for entry; or, projecting at least one piece of third visual information nearby a pedestrian allowed pavement when the traffic control state is pedestrian allowance, the third visual information indicating the passage of a pedestrian in front of a vehicle. Thus, the vehicle may be effectively reminded of avoidance of the pedestrian.

Alternatively, acquiring a traffic control state of a traffic management area comprises: acquiring a traffic control state of the traffic management area from at least one traffic light within the traffic management area, or acquiring a traffic control state in synchronization with at least one traffic light within the traffic management area.

According to a fourth embodiment, a traffic signal indicating apparatus is provided. The apparatus comprises: at least one memory, configured to store a machine-readable instruction; and at least one processor, configured to call the machine-readable instruction to execute the method provided by the third embodiment or any possible implementation mode of the third embodiment.

According to a fifth embodiment, a machine-readable medium is provided. The machine-readable medium comprises: a machine-readable instruction, when being executed by at least one processor, the machine-readable instruction executing the method provided by the third embodiment or any possible implementation mode of the third embodiment.

As above, a current indication method for traffic lights and the like has the disadvantages of non-significant signal indication, thereby making it difficult to attract a pedestrian, a vehicle and the like.

In the embodiments of the present invention, by projecting visual information for indicating a current traffic control state to a pavement of a traffic management area, a purpose of reminding a pedestrian and a vehicle is achieved. The projected visual information may transfer rich information, and it is unnecessary to modify existing traffic lights due to the present solution, which is effective and makes a slight modification on an existing system.

Here, the projected visual information may be changed flexibly according to a traffic control state. For example, it may prompt pedestrian prohibition and allowance, thereby further prompting a pedestrian advancing direction. In one embodiment, a pavement where a pedestrian may stay under a pedestrian prohibition state may be determined in accordance with the quantity of pedestrians, and a pedestrian is indicated, thereby improving the safety of pedestrian passage. In another embodiment, a signal may be projected to remind a vehicle of pedestrian passage.

A method provided in the embodiments of the present invention not only may be applied to an intersection, but also may be used for signal indication of various other road segments. As for indication of the intersection, the embodiments of the present invention not only are applied to a traditional intersection, but also may be used for intersections in various irregular shapes such as a T-shaped crossing.

The embodiments of the present invention will be described below in conjunction with the drawings in detail.

Figure 2:
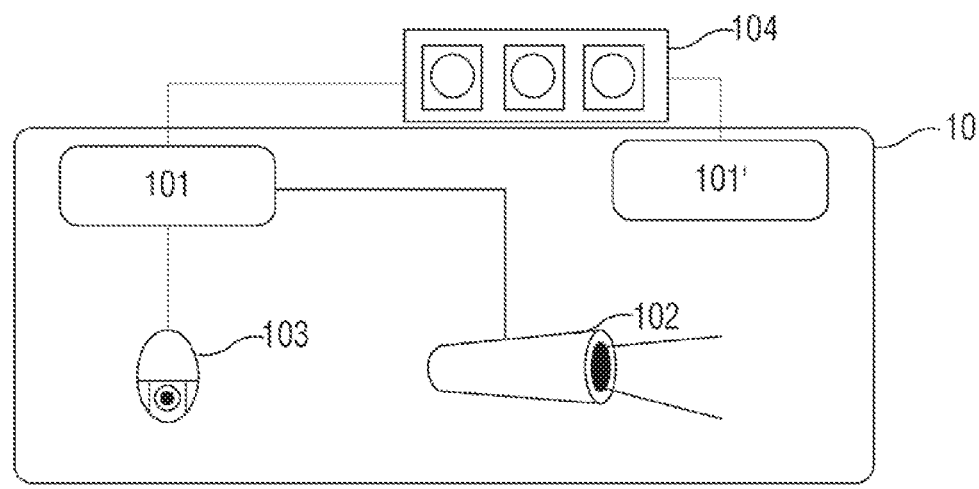
FIG. 2 is a structure diagram of another traffic signal indicating system provided in the embodiments of the present invention.
Figure 3:
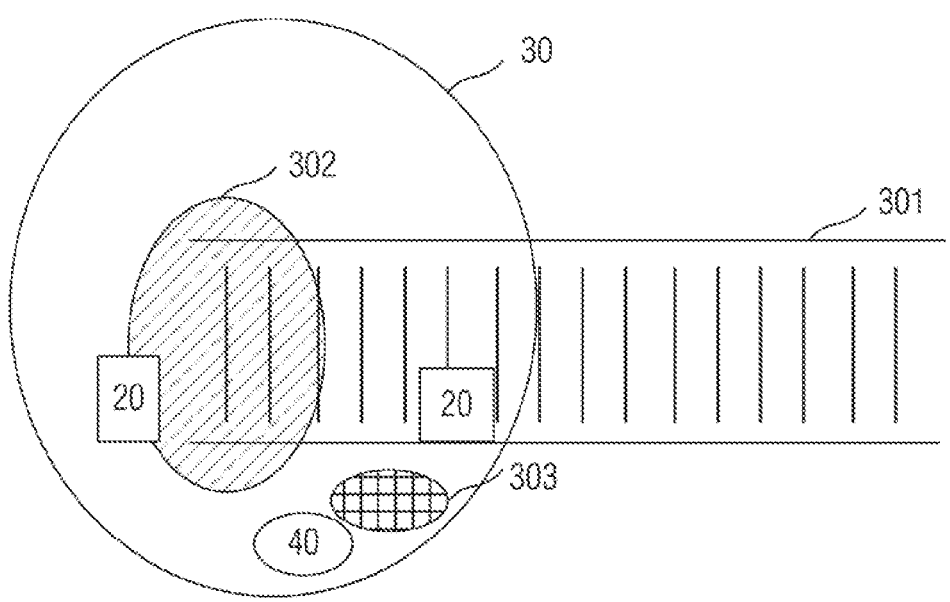
FIG. 3 is a schematic diagram of a traffic management area and all segments of pavements therein in the embodiments of the present invention.
Figure 5:
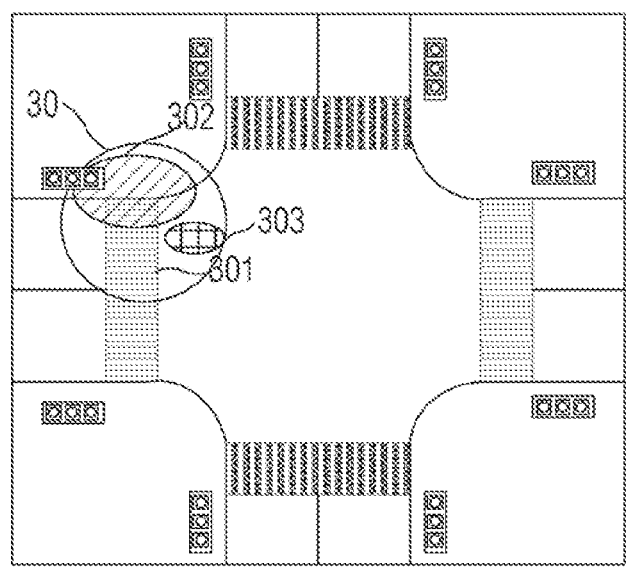
FIG. 5 is a schematic diagram of a traffic signal indicating method under different traffic control states in the embodiments of the present invention.

FIG. 1 and FIG. 2 are structure diagrams of a traffic signal indicating system 10 provided in the embodiments of the present invention. As shown in the figures, the traffic signal indicating system 10 may comprise:

a traffic signal indicating apparatus 101, configured to acquire a traffic control state of a traffic management area 30 (as shown in FIG. 3); and a projection apparatus 102, configured to project visual information for indicating the traffic control state to a pavement (such as a first-segment pavement 301, a second-segment pavement 302 and a third-segment pavement 303 as shown in FIG. 3) of the traffic management area 30 under the control of the traffic signal indicating apparatus 101. In addition, FIG. 5 shows the traffic management area 30 at an intersection and the foregoing three segments of pavements.

Here, the range of the traffic management area 30 may be determined according to engineering practice requirements. For example, the traffic management area may be near to one side of a corner of an intersection as shown in FIG. 5 (for example, the traffic management area is near to a lower side of a left upper corner of the intersection as shown in FIG. 5, the farthest part may reach a middle position of a zebra crossing, another traffic management area may be present at a left lower corner of the intersection, and the farthest part of this traffic management area may also reach the middle position of the zebra crossing). In order to implement signal indication of the traffic management area 30, at least one projection apparatus 102 may be installed within or nearby the traffic management area 30 in a mating manner, so as to project visual information to each segment of pavement within the traffic management area 30. In some embodiments of the present invention, it is necessary to photograph a pedestrian and/or vehicle via at least one sensor 103. In this case, each sensor 103 such as a camera should be reasonably installed according to the range of the traffic management area 30, so as to collect information within the traffic management area 30. Different traffic management areas 30 may be partially overlapped, so as to meet complete coverage requirements.

Figure 6:
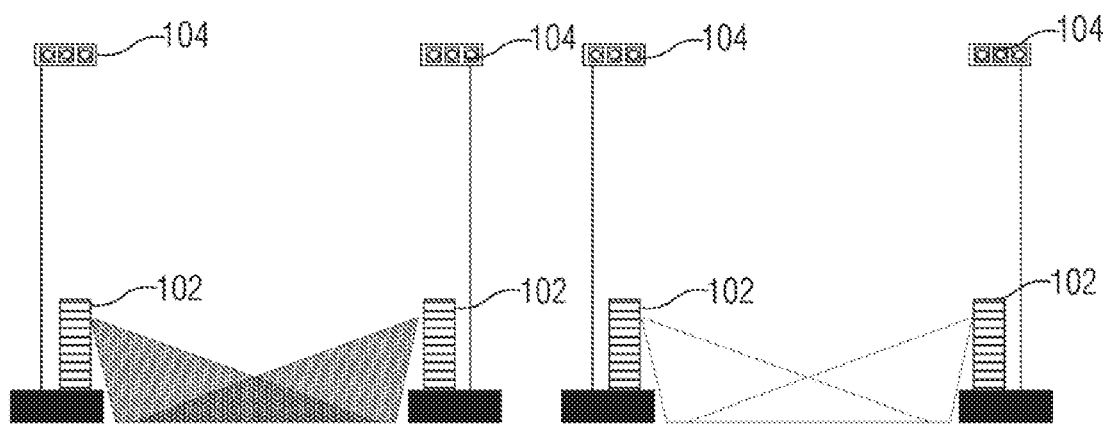
FIG. 6 is a schematic diagram of projection of visual information in the embodiments of the present invention.

The projection apparatus 102 may be placed on an isolation pile on a pavement, as shown in FIG. 6, wherein the left figure is a schematic diagram illustrating projection of first visual information via the projection apparatus 102 under a pedestrian prohibition state, and the right figure is a schematic diagram illustrating projection of first visual information via the projection apparatus 102 under a pedestrian allowance state. The traffic signal indicating apparatus 101 may be integrated with the projection apparatus 102, or may be placed at other positions to communicate with the projection apparatus 102 in a wireless manner.

Alternatively, as shown in FIG. 1, the traffic signal indicating apparatus 101 may be integrated on an existing traffic management system to acquire a current traffic control state from the traffic management system, wherein the traffic management system is further configured to control the change of a traffic light 104 according to the current traffic control state. That is, synchronization between the traffic signal state acquired by the traffic signal indicating apparatus 101 and the traffic light 104 is implemented. Or, as shown in FIG. 2, the traffic signal indicating apparatus 101 may acquire a current traffic control state from the traffic light 104. For example, the current traffic control state is acquired by acquiring a control signal sent from a traffic management system 101' to the traffic light 104. Or, an image of the traffic light 104 may be captured via a sensor 103 which may be a camera here, the captured image is sent to the traffic signal indicating apparatus 101, and the current traffic control state is determined by the traffic signal indicating apparatus 101 according to the image.

In some embodiments of the present invention, the traffic signal indicating apparatus 101 may acquire the quantity of pedestrians within the traffic management area 30 via at least one sensor 103. Here, the sensor 103 may be a camera distributed on at least one position. After pedestrians are photographed, the traffic signal indicating apparatus 101 performs image recognition, and calculates the quantity of the pedestrians. In another embodiment, the traffic signal indicating apparatus 101 may detect, via at least one sensor 103, whether a pedestrian is passing within the traffic management area 30, and whether a vehicle will enter the traffic management area 30.

Various signal projection solutions provided in the embodiments of the present invention will be described in conjunction with FIG. 4A and FIG. 4B. The flow may be executed by the projection apparatus 102 and the sensor 103 under the control of the foregoing traffic signal indicating apparatus 101.

Figure 4A:
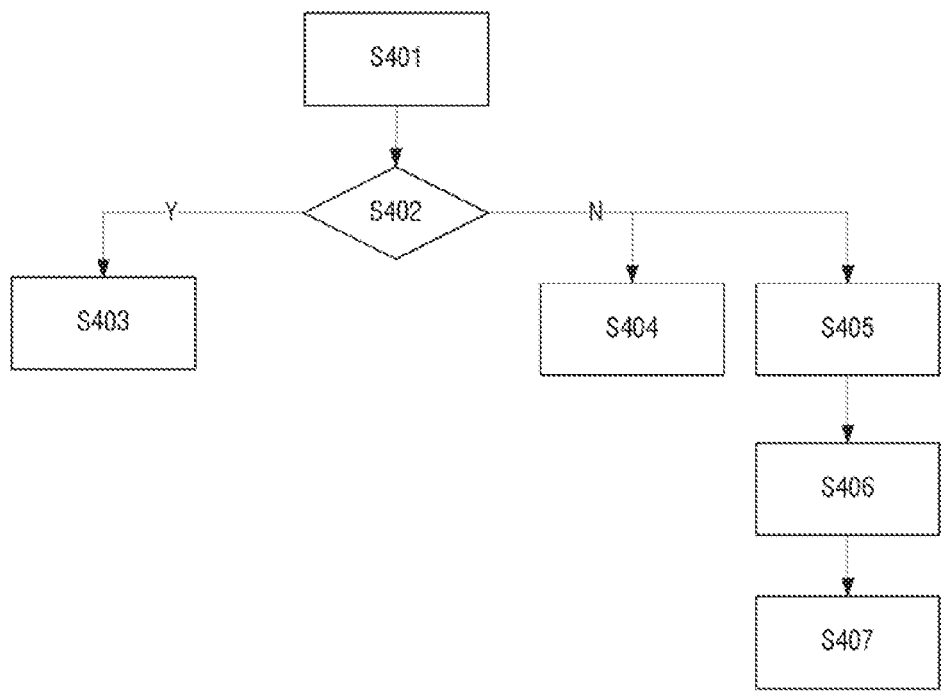
FIG. 4A and FIG. 4B are flowcharts of a traffic signal indicating method provided in the embodiments of the present invention.

In a flow as shown in FIG. 4A, the traffic signal indicating apparatus 101 acquires a traffic control state, and controls the projection apparatus 102 to project visual information according to the traffic control state. In a flow as shown in FIG. 4B, the traffic signal indicating apparatus 101 acquires pedestrian and vehicle movement situations, and when a pedestrian walks within the traffic management area 30 and a vehicle will enter the traffic management area 30, visual information for reminding the vehicle of avoidance is projected. Two flows are adopted for description respectively below.

The flow as shown in FIG. 4A may comprise the steps as follows.

S401: A traffic signal indicating apparatus 101 acquires a traffic control state of a traffic management area 30. As above, the traffic control state may be acquired from a traffic light 104 via at least one sensor 103 or from an existing traffic management system.

S402: The traffic signal indicating apparatus 101 judges the traffic control state. If the traffic control state is "pedestrian allowance" (branch of "Y" in FIG. 4A), S403 is executed, and otherwise, S404 and/or S405 are/is executed. Here, "are/is" means that functions corresponding to two steps may be achieved according to engineering design requirements. For example, two steps may be executed, or only one of the steps may be executed. If both the two steps are executed, S404 may be executed ahead of S405, or S405 may be executed ahead of S404, or the two steps may be executed at the same time.

Figure 7:
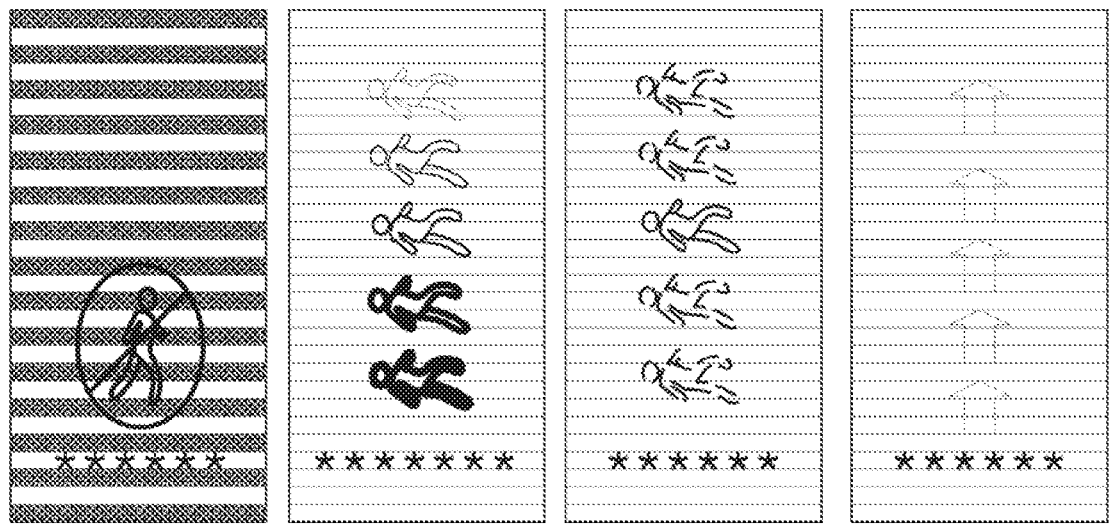
FIG. 7 is a schematic diagram of projection of visual information to a first-segment pavement in the embodiments of the present invention.

S403: The traffic signal indicating apparatus 101 controls a projection apparatus 102 to project first visual information for prompting pedestrian allowance to a first-segment pavement within the traffic management area 30, wherein the first-segment pavement may be all or part of a zebra crossing. For example, the first-segment pavement may be a part close to the projection apparatus 102 in the zebra crossing or may be a half or one third of the zebra crossing, and a specific signal projection range may be determined according to engineering practice requirements. The first visual information for prompting pedestrian allowance may be as shown in three right figures in FIG. 7. For example, green-and-white stripe-shaped first visual information may be projected. Alternatively, the first visual information may also prompt a pedestrian advancing direction. For example, in the left second figure in FIG. 7, a human mark on the ground is shallow increasingly in accordance with the pedestrian advancing direction. In two right figures in FIG. 7, the projected first visual information is dynamically variable, and the human mark or arrow on the ground moves in the pedestrian advancing direction, wherein a solid line graph is representative of the position of the first visual information at a certain moment, and a dotted line graph is representative of the position of the first visual information at a moment ahead of or later than this moment. Either mode can indicate the pedestrian advancing direction. Alternatively, the first visual information may further comprise a text "*" as shown in the figure such as "Thumb up for your patience, and you may safely pass now".

S404: The traffic signal indicating apparatus 101 controls the projection apparatus 102 to project first visual information for prompting pedestrian prohibition to a first-segment pavement in a pedestrian advancing direction within the traffic management area 30, wherein the first-segment pavement may be all or part of a zebra crossing. The first visual information for prompting pedestrian prohibition may be as shown in the left figure in FIG. 7. For example, red-and-white stripe-shaped first visual information may be projected. Alternatively, the first visual information may also comprise a pedestrian prohibition round mark as shown in the figure, and may further comprise a text "*" as shown in the figure such as "Please wait for a green light patiently for your safety".

S405: The traffic signal indicating apparatus 101 acquires the quantity of pedestrians within the traffic management area 30 via at least one sensor 103. For example, at least one camera may be installed within or nearby the traffic management area 30 and configured to photograph pedestrians waiting within the traffic management area 30. Alternatively, an area needing to count pedestrians in the traffic management area 30 may be determined by setting a pitch angle of the at least one camera and the like. Or, an image captured by the camera is recognized to judge whether a pedestrian is within the area needing to count pedestrians in the traffic management area 30, if so, the pedestrian is taken into count, and otherwise, the pedestrian is not taken into count. Alternatively, the area needing to count pedestrians in the traffic management area 30 is overlapped with the traffic management area 30. The traffic signal indicating apparatus 101 recognizes the quantity of pedestrians waiting currently from the captured image.

S406: The traffic signal indicating apparatus 101 determines a second-segment pavement where a pedestrian may stay whilst waiting within the traffic management area in accordance with the acquired quantity of pedestrians, such as a second-segment pavement 302 as shown in FIG. 3 and FIG. 5, wherein an alternative implementation mode is that: when the quantity of pedestrians within the traffic management area 30 is smaller than a preset threshold, as the quantity of pedestrians within the traffic management area 30 is larger, the area of the second-segment pavement is larger; and if the quantity of pedestrians within the traffic management area 30 reaches or exceeds the preset threshold, the range of the second-segment pavement is kept unchanged.

S407: The traffic signal indicating apparatus 101 controls the projection apparatus 102 to project second visual information for indicating a range within which a pedestrian may stay whilst waiting to the second-segment pavement 302. For example, second blue visual information may be projected to the second-segment pavement 302, or second blue visual information may be projected to an edge of the second-segment pavement 302, so as to indicate a range within which a pedestrian may stay whilst waiting.

Figure 4B:
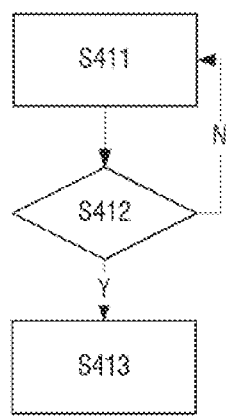

The flow as shown in FIG. 4B may comprise the steps as follows.

S411: A traffic signal indicating apparatus 101 collects information.

S412: The traffic signal indicating apparatus 101 judges whether a vehicle needs to avoid a pedestrian according to the collected information, if so, S413 is executed, and otherwise, S411 is re-executed.

S413: Third visual information is projected to a third-segment pavement within a traffic management area 30, and used to instruct the vehicle to avoid the pedestrian.

During implementation, the flow as shown in FIG. 4B may comprise, but not limited to, the following alternative implementation modes.

Mode 1

Figure 8:
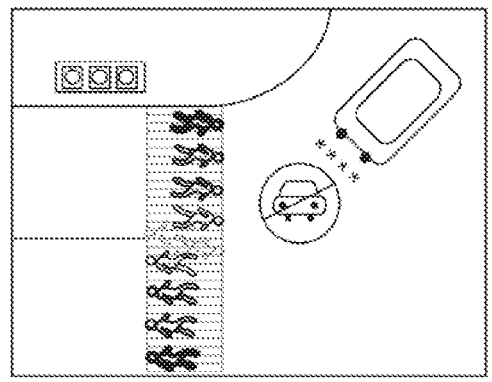
FIG. 8 is a schematic diagram of projection of visual information to a third-segment pavement in the embodiments of the present invention.

In S411, the traffic signal indicating apparatus 101 photographs a traffic management area 30 and a neighbor area via at least one sensor 103 such as a camera, and determines a pedestrian passage situation and a vehicle entry situation within the traffic management area 30 via image recognition. In S412, when the traffic signal indicating apparatus 101 detects that a pedestrian is passing within the traffic management area 30 and a vehicle will enter the traffic management area, it is determined that the vehicle needs to avoid the pedestrian. In S413, the traffic signal indicating apparatus 101 controls the projection apparatus 102 to project third visual information to a third-segment pavement 303 in an advancing direction of the vehicle waiting for entry, the third visual information indicating the passage of a pedestrian in front of a vehicle waiting for entry, as shown in FIG. 8. Alternatively, the third visual information may further comprise a text such as "Be patient, yield to pedestrians".

Mode 2

In S411, the traffic signal indicating apparatus 101 photographs a traffic management area 30 and a neighbor area via at least one sensor 103 such as a camera, and determines a vehicle entry situation within the traffic management area 30 via image recognition. In S412, when the traffic signal indicating apparatus 101 detects that a vehicle will enter the traffic management area 30 and a current traffic control state is pedestrian allowance, it is determined that the vehicle needs to avoid the pedestrian. In S413, the traffic signal indicating apparatus 101 controls the projection apparatus 102 to project third visual information to a third-segment pavement 303 in an advancing direction of the vehicle, the third visual information indicating the passage of a pedestrian in front of a vehicle waiting for entry. Similarly, as shown in FIG. 8, visual information may be projected, the visual information may also comprise the foregoing text.

Mode 3

In S411, the traffic signal indicating apparatus 101 photographs a traffic light 104 via at least one sensor 103, and determines a current traffic control state of the traffic management area 30 via image recognition, or acquires a current traffic control state of the traffic management area 30 from an existing traffic management system. In S412, the traffic signal indicating apparatus 101 determines that a vehicle needs to avoid a pedestrian when the current traffic control state is pedestrian allowance. In S413, the traffic signal indicating apparatus 101 controls the projection apparatus 102 to project at least one piece of third visual information nearby a pedestrian allowed pavement, the third visual information indicating the passage of a pedestrian in front of a vehicle that will enter the traffic management area 30.

An alternative implementation solution of a traffic signal indicating apparatus 101 provided in the embodiments of the present invention will be described below in conjunction with FIG. 9 and FIG. 10.

Figure 9:
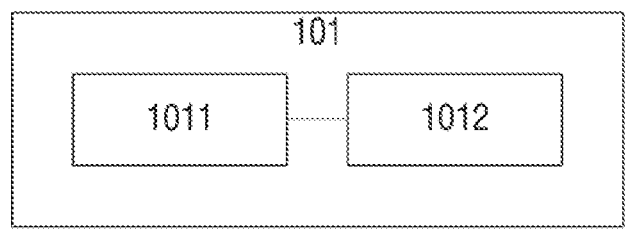
FIG. 9 is a structure diagram of a traffic signal indicating apparatus provided in the embodiments of the present invention.

As shown in FIG. 9, the traffic signal indicating apparatus may comprise:

a state acquisition module 1011, configured to acquire a traffic control state of a traffic management area; and a projection module 1012, configured to project first visual information for indicating the traffic control state to a first-segment pavement within the traffic management area.

Alternatively, when the traffic control state acquired by the state acquisition module 1011 is pedestrian prohibition, the projection module 1012 is specifically configured to project the first visual information for prompting pedestrian prohibition to the first-segment pavement in a pedestrian advancing direction within the traffic management area.

Alternatively, when the traffic control state acquired by the state acquisition module 1011 is pedestrian allowance, the projection module 1012 is specifically configured to project the first visual information for prompting pedestrian allowance to the first-segment pavement in a pedestrian advancing direction within the traffic management area, wherein the first visual information for prompting pedestrian allowance further prompts the pedestrian advancing direction.

Alternatively, when the traffic control state acquired by the state acquisition module 1011 is pedestrian prohibition, the state acquisition module 1011 is further configured to acquire the quantity of pedestrians within the traffic management area, and the projection module 1012 is further configured to determine a second-segment pavement where a pedestrian may stay whilst waiting within the traffic management area in accordance with the acquired quantity of pedestrians, and project second visual information for indicating a range within which a pedestrian may stay whilst waiting to the determined second-segment pavement, wherein as the quantity of pedestrians within the traffic management area is larger, the area of the second-segment pavement is larger.

Alternatively, the state acquisition module 1011 is further configured to detect a pedestrian passage situation and a vehicle entry situation within the traffic management area; and the projection module 1012 is further configured to project, when the state acquisition module 1011 detects that a pedestrian is passing within the traffic management area and a vehicle will enter the traffic management area, third visual information to a third-segment pavement in a vehicle advancing direction, the third visual information indicating the passage of a pedestrian in front of a vehicle waiting for entry.

Alternatively, the state acquisition module 1011 is further configured to detect a vehicle entry situation of the traffic management area, and the projection module 1012 is further configured to project, when the state acquisition module 1011 detects that a vehicle will enter the traffic management area and the traffic control state is pedestrian allowance, third visual information to a third-segment pavement in the vehicle advancing direction, the third visual information indicating the passage of a pedestrian in front of a vehicle waiting for entry.

Alternatively, the projection module 1012 is further configured to project, when the traffic control state is pedestrian allowance, at least one piece of third visual information nearby a pedestrian allowed pavement, the third visual information indicating the passage of a pedestrian in front of a vehicle.

Alternatively, the state acquisition module (1011) is specifically configured to acquire a traffic control state of the traffic management area from at least one traffic light within the traffic management area, or acquire a traffic control state in synchronization with at least one traffic light within the traffic management area.

Other alternative implementation modes of the traffic signal indicating apparatus 101 as shown in FIG. 9 may refer to implementation of the traffic signal indicating apparatus 101 as shown in FIG. 1 to FIG. 8, wherein the state acquisition module 1011 executes operations such as information collection and state acquisition, the projection module 1012 is configured to determine a signal projection range, and the projection apparatus 102 is controlled to project visual information.

Figure 10:
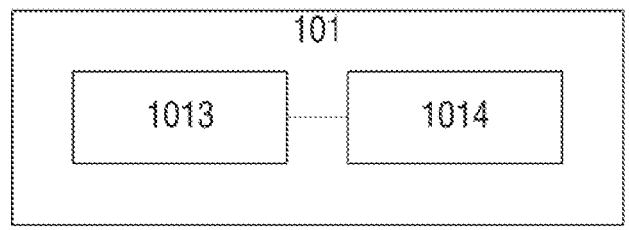
FIG. 10 is a structure diagram of another traffic signal indicating apparatus provided in the embodiments of the present invention.

A structure as shown in FIG. 10 may be regarded as a hardware implementation mode of the traffic signal indicating apparatus 101, wherein at least one memory 1013 is configured to store a machine-readable instruction; and at least one processor 1014 is configured to call the machine-readable instruction to execute the foregoing operations executed by the traffic signal indicating apparatus 101. In addition, the traffic signal indicating apparatus may further comprise at least one communication interface for receiving information collected by at least one sensor 103, and sending a control instruction to the projection apparatus 102 (the situation of sending the control instruction is not applied to a situation of integration of the projection apparatus 102 and the traffic signal indicating apparatus 101).

Another alternative hardware implementation mode of the traffic signal indicating apparatus 101 is: pre-firing logics implemented by the foregoing flow steps of the traffic signal indicating apparatus 101 in dedicated circuits or logic devices (such as dedicated processor, FPGA or ASIC). Thus, theses dedicated circuits or logic devices may complete the processing flow of the foregoing traffic signal indicating apparatus 101 after being electrified.

To sum up, the embodiments of the present invention provide a traffic signal indicating method, apparatus and system, and a machine-readable medium, so as to implement signal indication for a pedestrian and a vehicle. By way of a method for projecting visual information, indications obtained by the pedestrian and/or the vehicle are clearer and more definite, wherein a signal indication solution may be used to indicate pedestrian prohibition, pedestrian allowance and a passage direction, or may also be used to instruct the vehicle to avoid the pedestrian. In some embodiments, a range where a pedestrian may stay may be determined based on the quantity of pedestrians waiting for passage, and the pedestrian is indicated of the range. The implementation is simple, it is unnecessary to change an existing traffic management system, the pedestrian and the vehicle can be more easily attracted by projecting colorful and pattern-diversified signals to a pavement, and are definitely indicated, so that the implementation is flexible.

It should be noted that not all steps and modules in each of the foregoing flows and each system structure diagram are necessary, and some steps or modules may be omitted according to a practical requirement. The execution sequence of all the steps is not fixed, and may be adjusted as required. A system structure described in each of the foregoing embodiments may be a physical structure or may be a logic structure. That is, some modules may be implemented by the same physical entity, or, some modules may be implemented by a plurality of physical entities or may be jointly implemented by some components in a plurality of independent devices.

The present invention is displayed and described in detail above by way of the drawings and preferred embodiments. However, the present invention is not limited to these disclosed embodiments, and other solutions derived therefrom by those skilled in the art also fall within the scope of protection of the present invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A traffic signal indicating method, comprising:
  acquiring a traffic control state of a traffic management area; and
  projecting first visual information for indicating the traffic control state to a first-segment of pavement within the traffic management area, wherein, upon the traffic control state being pedestrian prohibition,
  acquiring a quantity of pedestrians within the traffic management area;
  determining an area of a second-segment of pavement, where a pedestrian may stay whilst waiting within the traffic management area in accordance with the quantity of pedestrians acquired, wherein as the quantity of pedestrians acquired within the traffic management area becomes larger, the determined area of the second-segment of pavement becomes larger; and
  projecting second visual information for indicating a range within which a pedestrian may stay whilst waiting for the second-segment of pavement to be determined.

2. The method of claim 1, wherein, upon the traffic control state of the traffic management area acquired being one of at least two states,
  the method further comprising:
  storing the first visual information corresponding to each of the at least two states respectively, and
  acquiring, after the acquiring of the traffic control state of the traffic management area, the respective first visual information stored, corresponding to the respective traffic control state of the at least two states; and
  wherein the projecting of the first visual information comprises projecting the acquired stored respective first visual information corresponding to the respective traffic control state.

3. The method of claim 1, wherein either, upon the traffic control state being pedestrian prohibition, the projecting of the first visual information for indicating the traffic control state to the first-segment of pavement within the traffic management area comprises projecting the first visual information for prompting pedestrian prohibition to the first-segment of pavement in a pedestrian advancing direction within the traffic management area; or upon the traffic control state being pedestrian allowance, the projecting of the first visual information for indicating the traffic control state to the first-segment of pavement within the traffic management area comprises projecting the first visual information for prompting pedestrian allowance to the first-segment of pavement in a pedestrian advancing direction within the traffic management area, wherein the first visual information for prompting pedestrian allowance further prompts the pedestrian advancing direction.

4. The method of claim 1, further comprising either:

detecting a pedestrian passage situation and a vehicle entry situation within the traffic management area, and projecting third visual information to a third-segment of pavement in a vehicle advancing direction upon detecting that a pedestrian is passing within the traffic management area and a vehicle will enter the traffic management area, the third visual information indicating passage of a pedestrian in front of a vehicle waiting for entry; or detecting a vehicle entry situation of the traffic management area, and projecting third visual information to the third-segment of pavement in the vehicle advancing direction upon detecting that a vehicle will enter the traffic management area and the traffic control state being pedestrian allowance, the third visual information indicating passage of a pedestrian in front of a vehicle waiting for entry; or projecting at least one piece of third visual information nearby a pedestrian allowed pavement upon the traffic control state being pedestrian allowance, the third visual information indicating passage of a pedestrian in front of a vehicle.

5. The method of claim 1, wherein the acquiring of the traffic control state of a traffic management area comprises either: acquiring the traffic control state of the traffic management area from at least one traffic light within the traffic management area, or acquiring the traffic control state in synchronization with at least one traffic light within the traffic management area.

6. A traffic signal indicating apparatus, comprising:

at least one memory, configured to store a machine-readable instruction; and at least one processor, configured to call the machine-readable instruction to execute:

acquiring a traffic control state of a traffic management area; and projecting first visual information for indicating the traffic control state acquired to a first-segment of pavement within the traffic management area, wherein upon the traffic control state being pedestrian prohibition, the at least one processor is further configured to execute, upon the machine-readable instruction being called by the at least one processor:

acquiring a quantity of pedestrians within the traffic management area;

determining an area of a second-segment of pavement, where a pedestrian may stay whilst waiting within the traffic management area in accordance with the quantity of pedestrians acquired, wherein as the quantity of pedestrians acquired within the traffic management area becomes larger, the determined area of the second-segment of pavement becomes larger; and projecting second visual information for indicating a range within which a pedestrian may stay whilst waiting for the second-segment of pavement to be determined.

7. The apparatus of claim 6, wherein, upon the traffic control state acquired of the traffic management area being one of at least two states, the at least one processor is further configured to execute, upon the machine-readable instruction being called by the at least one processor:

storing the first visual information corresponding to each of the at least two states respectively, and acquiring, after the acquiring of the traffic control state of the traffic management area, the respective first visual information stored, corresponding to the respective traffic control state of the at least two states; and wherein the projecting of the first visual information comprises projecting the acquired stored respective first visual information corresponding to the respective traffic control state.

8. The apparatus of claim 6, wherein upon the traffic control state being pedestrian prohibition, the at least one processor is further configured to execute, upon the machine-readable instruction being called by the at least one processor—: projecting the first visual information for prompting pedestrian prohibition to the first-segment of pavement in a pedestrian advancing direction within the traffic management area; or upon the traffic control state being pedestrian allowance, the at least one processor is further configured to execute, upon the machine-readable instruction being called by the at least one processor: projecting the first visual information for prompting pedestrian allowance to the first-segment of pavement in a pedestrian advancing direction within the traffic management area, wherein the first visual information for prompting pedestrian allowance further prompts the pedestrian advancing direction.

9. The apparatus of claim 6, wherein the at least one processor is further configured to execute, upon the machine-readable instruction being called by the at least one processor, either:

detecting a pedestrian passage situation and a vehicle entry situation within the traffic management area, and projecting third visual information to a third-segment of pavement in a vehicle advancing direction upon detecting that a pedestrian is passing within the traffic management area and a vehicle will enter the traffic management area, the third visual information indicating passage of a pedestrian in front of a vehicle waiting for entry; or detecting a vehicle entry situation of the traffic management area, and projecting third visual information to the third-segment of pavement in the vehicle advancing direction upon detecting that a vehicle will enter the traffic management area and the traffic control state being pedestrian allowance, the third visual information indicating passage of a pedestrian in front of a vehicle waiting for entry; or projecting at least one piece of third visual information nearby a pedestrian allowed pavement upon the traffic control state being pedestrian allowance, the third visual information indicating passage of a pedestrian in front of a vehicle.

10. The apparatus of claim 6, wherein the at least one processor is further configured to execute either, upon the machine-readable instruction being called by the at least one processor, and upon acquiring the traffic control state of the traffic management area: acquiring the traffic control state of the traffic management area from at least one traffic light within the traffic management area, or acquiring the traffic control state in synchronization with at least one traffic light within the traffic management area.

11. A non-transitory machine-readable medium, comprising a machine-readable instruction which, upon being executed by at least one processor, causes the at least one processor to—:

acquire a traffic control state of a traffic management area; and project first visual information for indicating the traffic control state acquired to a first-segment of pavement within the traffic management area, wherein upon the traffic control state is pedestrian prohibition, the machine-readable instruction is further configured to cause the at least one processor to:

acquire a quantity of pedestrians within the traffic management area;

determine an area of a second-segment of pavement, where a pedestrian may stay whilst waiting within the traffic management area in accordance with the quantity of pedestrians acquired, wherein as the quantity of pedestrians acquired within the traffic management area becomes larger, the determined area of the second-segment of pavement becomes larger; and project second visual information for indicating a range within which a pedestrian may stay whilst waiting for the second-segment of pavement to be determined.

12. The medium of claim 11, wherein, upon the traffic control state acquired being one of at least two states, the machine-readable instruction is further configured to cause the at least one processor to:

store the first visual information corresponding to each of the at least two states respectively, and acquire, after the acquiring of the traffic control state of the traffic management area, the respective first visual information stored, corresponding to the respective traffic control state of the at least two states; and wherein the projecting of the first visual information comprises projecting the acquired stored respective first visual information corresponding to the respective traffic control state.

13. The medium of claim 11, wherein upon the traffic control state being pedestrian prohibition, the machine-readable instruction is further configured to cause the at least one processor to: project the first visual information for prompting pedestrian prohibition to the first-segment of pavement in a pedestrian advancing direction within the traffic management area; or upon the traffic control state being pedestrian allowance, the machine-readable instruction is further configured to cause the at least one processor to: project the first visual information for prompting pedestrian allowance to the first-segment of pavement in a pedestrian advancing direction within the traffic management area, wherein the first visual information for prompting pedestrian allowance further prompts the pedestrian advancing direction.

14. The medium of claim 11, characterized in that the machine-readable instruction is further configured to cause the at least one processor to either:

detect a pedestrian passage situation and a vehicle entry situation within the traffic management area, and projecting third visual information to a third-segment of pavement in a vehicle advancing direction upon detecting that a pedestrian is passing within the traffic management area and a vehicle will enter the traffic management area, the third visual information indicating passage of a pedestrian in front of a vehicle waiting for entry; or detect a vehicle entry situation of the traffic management area, and projecting third visual information to the third-segment of pavement in the vehicle advancing direction upon detecting that a vehicle will enter the traffic management area and the traffic control state being pedestrian allowance, the third visual information indicating passage of a pedestrian in front of a vehicle waiting for entry; or project at least one piece of third visual information nearby a pedestrian allowed pavement upon the traffic control state being pedestrian allowance, the third visual information indicating passage of a pedestrian in front of a vehicle.

15. The medium of claim 11, wherein the machine-readable instruction is further configured to cause the at least one processor to either, upon acquiring a traffic control state of a traffic management area:

acquire the traffic control state of the traffic management area from at least one traffic light within the traffic management area, or acquire the traffic control state in synchronization with at least one traffic light within the traffic management area.

16. The method of claim 2, wherein either, upon the traffic control state being pedestrian prohibition, the projecting of the first visual information for indicating the traffic control state to the first-segment of pavement within the traffic management area comprises projecting the first visual information for prompting pedestrian prohibition to the first-segment of pavement in a pedestrian advancing direction within the traffic management area; or upon the traffic control state being pedestrian allowance, the projecting of the first visual information for indicating the traffic control state to the first-segment of pavement within the traffic management area comprises: projecting the first visual information for prompting pedestrian allowance to the first-segment of pavement in a pedestrian advancing direction within the traffic management area, wherein the first visual information for prompting pedestrian allowance further prompts the pedestrian advancing direction.

17. A traffic signal indicating method, comprising:

acquiring a traffic control state of a traffic management area; and projecting first visual information for indicating the traffic control state to a first-segment of pavement within the traffic management area, wherein, upon the traffic control state being pedestrian prohibition, acquiring a quantity of pedestrians within the traffic management area;

determining a second-segment of pavement, where a pedestrian may stay whilst waiting within the traffic management area in accordance with the quantity of pedestrians acquired, wherein as the quantity of pedestrians acquired within the traffic management area becomes larger, an area of the second-segment of pavement determined becomes larger;

projecting second visual information for indicating a range within which a pedestrian may stay whilst waiting for the second-segment of pavement to be determined and either:

detecting a pedestrian passage situation and a vehicle entry situation within the traffic management area, and projecting third visual information to a third-segment of pavement in a vehicle advancing direction upon detecting that a pedestrian is passing within the traffic management area and a vehicle will enter the traffic management area, the third visual information indicating passage of a pedestrian in front of a vehicle waiting for entry; or detecting a vehicle entry situation of the traffic management area, and projecting third visual information to the third-segment of pavement in the vehicle advancing direction upon detecting that a vehicle will enter the traffic management area and the traffic control state being pedestrian allowance, the third visual information indicating passage of a pedestrian in front of a vehicle waiting for entry; or projecting at least one piece of third visual information nearby a pedestrian allowed pavement upon the traffic control state being pedestrian allowance, the third visual information indicating passage of a pedestrian in front of a vehicle.

* * * * *